P. MUELLER.
SEAL FOR SERVICE COCKS.
APPLICATION FILED NOV. 10, 1911.
1,033,072.
Patented July 16, 1912.
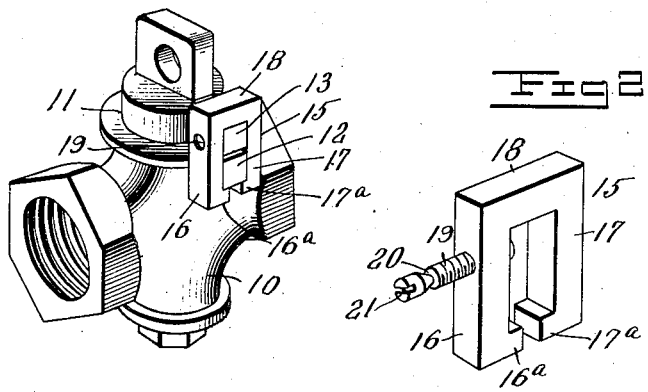
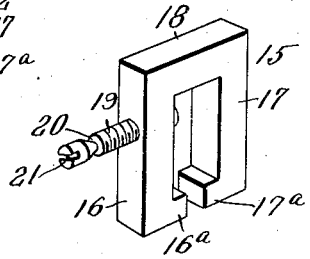
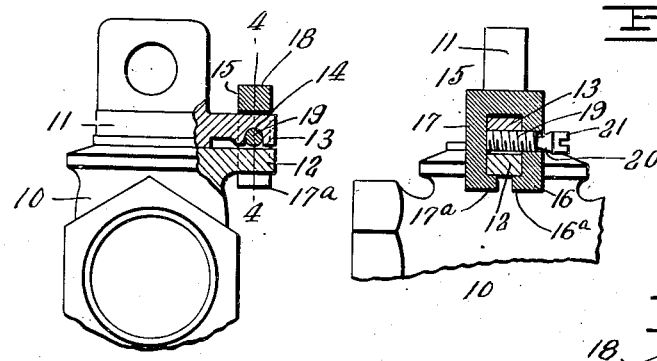
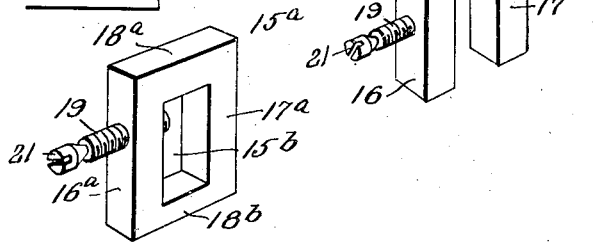
Inventor
Philip Mueller
Witnesses
By Meyers, Cushman & Rea
Attorney

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

SEAL FOR SERVICE-COCKS.

1,033,072.  Specification of Letters Patent.  Patented July 16, 1912.

Application filed November 10, 1911. Serial No. 659,574.

*To all whom it may concern:*

Be it known that I, PHILIP MUELLER, a citizen of the United States, residing at Decatur, in the county of Macon and State of Illinois, have invented new and useful Improvements in Seals for Service-Cocks, of which the following is a specification.

This invention relates to an improvement in seals or locking means for use on cocks in connection with gas and water service, and is shown and described herein as being applied to what is known to the trade as lock-wing gas cocks, in which a wing is cast on the cock body and a similar wing on the key for the same. Heretofore these wings have been so made that when the cock is in closed position, holes which are bored in the wings register with each other and thus make it possible to attach a padlock to such a cock by passing the bow of the lock through said holes and thus lock the cock in closed position, making it impossible to tamper with the same, unless the padlock is maliciously opened, broken or stolen. This method of locking the gas cocks is expensive, not only because the cost of a good padlock is nearly equal that of the cock itself, but such locks are liable to be opened by persons criminally inclined, and the cock turned on and the gas used without authority or knowledge of the company that furnished the gas or water. This difficulty, however, is overcome by the present invention as besides locking the cock in closed position, it forms a cheap, substantial and practical sealing means for the cock key, which as soon as the cock is tampered with, or an attempt made to turn the key even slightly the combined lock and seal is broken and cannot be replaced by the one who broke it, as this special form of lock and seal can be obtained only from those who have authority to operate the cocks. After the cock has once been locked and sealed the key cannot be turned without breaking said member, as it is made of a frangible material and so fastened to the cock that it cannot be removed even by those in authority without breaking it.

This invention, although designed primarily for use on gas cocks and will be so described in connection therewith throughout this specification, may, with equal advantage, be applied to other kinds of cocks, such as are used for regulating the flow of water and oil, and also to other articles and in other situations than that to which the specific embodiment herein described is adapted. It is well known that there are gas lock wing cock seals of various kinds in use at the present time, and serving the same purpose as a padlock, but these are objectionable for several reasons. Most of them are quite expensive and difficult to make, and when frequent renewals are required, owing to the number of times which the cocks must be opened and closed on some occasions, the expense involved in renewing these seals alone amounts to a considerable item. Furthermore, most of these seals require special tools to affix them to the cock, or special rivets are necessary, and the expense of providing these tools must be taken into consideration, besides the inconvenience of carrying them all the time when needed but a part of the time. In other forms of seals, rivets or keys are used, and when these are broken it has been found that they can easily be duplicated by parties desiring to break the seals without authority, and who provide themselves with suitable sealing pliers or tools so that they can imitate the exact seal and thus it is known that the seal is sometimes broken and made again with such skill that the cocks have been tampered with a number of times and much gas or other fluid stolen before the theft has been detected.

Another important object of the invention is to do away with the large wings cast on the cock and the key, and also to eliminate the necessity of boring holes in said wings to receive the padlock or seal, as by the present invention small lugs are used instead of the large wings and a considerable saving in material is effected as well as a saving in the cost of boring the holes in the wings, and a further saving in the cost of padlocks which are unnecessary.

In carrying out the invention, instead of casting relatively large wings on the cock and the key, small projecting lugs are substituted therefor, as noted above, and when these lugs are alined on closing the cock, a locking and sealing member, made of frangible material, is placed over the lugs and secured in place by some suitable means which cannot be removed, thereby rendering it impossible to disconnect the member and the cock can only be opened by breaking said member.

The object of the invention, therefore, is to provide a frangible combined lock and seal member for its intended purposes which shall be cheap and efficient and which may be easily and quickly applied by the use of a simple tool in a few minutes, and when applied, securely locks and seals the parts against movement without breaking said member which will be very difficult and troublesome to duplicate.

This invention will be more readily understood by referring to the following detail description in connection with the accompanying drawings, in which—

Figure 1 is a perspective view of a gas cock with the sealing device applied thereto. Fig. 2 is a perspective view of the lock and seal member disconnected from the cock. Fig. 3 is an end view of the upper portion of a cock, the sealing device being shown in section. Fig. 4 is a side view of a cock with the sealing device in section on the line 4—4 of Fig. 3. Fig. 5 is a view of a modified form of the lock and seal member. Fig. 6 is a similar view of a further modification of the same part.

Referring to the drawings, the numeral 10 designates the gas cock body, of well known type, and 11 the turning key therefor. Projecting laterally from the side of the gas cock and flush with the opening into which the key 11 enters is a lug or projection 12 cast on the cock body. A similar projection 13 of the same width as the lug or projection 12 extends laterally from the key 11 in such position as to aline with the latter lug when the cock is turned to full cut-off position. One of said projections, preferably the one numbered 13, has a notch, groove or depression 14 in its underside for a purpose to be hereinafter described.

The projections 12 and 13, when placed in parallelism are secured together so that neither key nor cock body can be turned relatively to each other, by means of a locking member 15 which, in the present instance, is formed with two parallel legs 16 and 17, spaced apart and connected at the top by a transverse bar 18. A foot 16$^a$ is formed on the lower end of leg 16 and projects inwardly for a short distance. The leg 17 is also provided with a similar foot 17$^a$. This locking member is preferably made of cast iron or some other frangible material in a single piece which may be easily broken by a hammer when it is desired to turn the key of the cock. Even an attempt to turn the key with the locking member thereon, will break the latter. In the present form of the invention a pin or screw 19 having a weakened portion 20 near its outer end which may be made by turning a groove therein, is driven or threaded into one of the legs 16 of the locking member 15, and abuts against the inner side of the opposite leg 17 when said pin or screw is driven home to secure the locking member in place on the cock.

When it is desired to cut off gas or other fluid passing through the cock, the key is turned until the projection 13 on the key is parallel with the projection 12 on the cock. The locking and sealing member 15 is then placed over the projections with the feet 16$^a$ and 17$^a$ extending under the lug 12, as clearly shown in the drawing, and the screw 19 preferably turned until its inner end strikes the leg 17 of said member, the screw passing through the notch 14 in the projection 13. The head of the screw may then be struck with a hammer which will cause it to break off just within the face or side of the locking and sealing member, or a continual turning of the screw driver after the inner end of the screw strikes the leg 17 will cause the screw-head to break off as the weakened portion of said screw is only sufficiently strong to permit the screw being driven home, but not strong enough to stand the extra strain which may be placed upon it after it has reached its limit of movement. The locking member, therefore, not only serves as a means for preventing the key being turned, but also as a seal, it being practically impossible to remove the member after the head of the screw has been broken off within the screw hole without breaking said member.

Should an unauthorized person desire to open the cock for the purpose of surreptitiously using the fluid passing therethrough it will be necessary for such person to break the locking member, and as such members are difficult to procure, they being in possession only of persons authorized to use them, the action of said person would be discovered. As a further protection the locking member may be provided with the monogram, initial or other insignia of the company owning the cock, so that should a new locking member be made and applied the difference between said locking member and that of the one originally placed on the cock will be easily detected.

After locking and sealing the cock, if the latter is to be turned on, any authorized person may break the locking member with a blow of a hammer or other instrument, or by turning the key 11, and remove the fragments, thus releasing the key and permitting it to be turned to open the cock.

Modifications of the locking and sealing member are shown in Figs. 5 and 6. In Fig. 5, in place of the feet 16$^a$ and 17$^a$ on the ends of the legs 16 and 17, a cross piece 18$^b$ 13 extends between said legs, thus changing a U-shaped member into a rectangular one having an elongated opening 15$^b$ therethrough.

In Fig. 6, the legs 16 and 17 have neither feet at their ends, nor a cross bar connecting said ends, but are perfectly plain throughout their length. Under certain conditions this form of locking and sealing member may be used, but the preferred form or the form shown in Fig. 5 gives greater security owing to the fact that if the screw holding the plug 11 in the cock be removed, said plug may be withdrawn from its seat together with the locking and sealing member if of the type illustrated in Fig. 6, whereas with the preferred type, or with that shown in Fig. 5, the feet 16$^a$, 17$^a$ or the cross bar 18$^b$ prevent such removal.

This device is easy to manufacture and is very cheap, as the members are produced in large quantities from the same pattern and the screw hole formed therein made on well known drilling and threading machines. Furthermore, the device is easily applied and as easily removed, the only tools being necessary are those always carried by a plumber or other person, namely a hammer and a screw-driver.

It is to be understood that the form of the locking member herein shown is designed particularly for use on cocks, but other forms may be given to said member without departing from the spirit of the invention, and furthermore, it may be used to seal together two or more parts other than a cock. Likewise where the word "screw" appears in the claims, any equivalent therefor, such as a pin, may be substituted.

Having fully described my invention, what I claim is:

1. In combination, a plurality of parts adapted to be brought into parallelism, a frangible locking and sealing member adapted to embrace said parallel parts, and an irremovable means in one side of said member for rigidly fastening the same to the parallel parts.

2. In combination, a cock body having a projection, a turning plug having a similar projection adapted to be brought into parallelism with the projection on the cock body, a locking and sealing member embracing said projections to hold them against relative movement, and a screw for holding said member in position, said screw having a weakened portion intermediate its ends, whereby its slotted end may be broken off.

3. In combination, a cock body having a projection, a turning plug having a similar projection adapted to be brought into parallelism with the projection on the cock body, a locking and sealing member embracing said projections to hold them against relative movement, and a screw threaded into a part of said member and passing between said projections, said screw having a weakened portion intermediate its ends, whereby its slotted end may be broken off.

4. In combination, a cock body having a projection, a turning plug having a similar projection adapted to be brought into parallelism with the projection on the cock body, a U-shaped locking and sealing member straddling said projections to hold them against relative movement, and a screw threaded into one leg of said member and passing between said projections, said screw having a weakened portion below its head which latter may be broken off after the screw has been driven home.

5. In combination, a cock body having a projection, a turning plug having a similar projection adapted to be brought into parallelism with the projection on the cock body, a locking and sealing member straddling said projections and provided with integral means extending under the same, said member designed to hold the projections against relative movement, and a screw threaded into one leg of said member and passing between said projections, said screw having a weakened portion below its head which latter may be broken off after the screw has been driven home.

6. In combination, a cock body having a projection, a turning plug having a similar projection adapted to be brought into parallelism with the projection on the cock body, a locking and sealing member straddling said projections and provided with an inwardly turned foot on each leg of said member extending beneath said projections to hold the latter against relative movement, and a screw threaded into one leg of said member and passing between said projections, said screw having a weakened portion below its head which latter may be broken off after the screw has been driven home.

7. In combination, a cock body having a projection, a turning plug having a similar projection adapted to be brought into parellelism with the projection on the cock body, one of the adjacent faces of said projections having a transverse notch therein, a U-shaped locking member straddling said projections to hold them against relative movement, and a screw threaded into one leg of said member and passing through said notch to abut against the other leg, said screw having a weakened portion below its head which may be broken off within the leg after the screw has been driven home.

8. A locking seal comprising a frangible U-shaped member adapted to closely embrace and retain in fixed position a plurality of parts, and a movable securing means for and carried by one side of said frangible member to immovably fasten the flangible member in place, and be then made irremovable.

9. A sealing device embodying a frangible member adapted to embrace two parts to be sealed, said member having a threaded opening in one side, and a screw tapped in said opening, said screw having a weakened portion adjacent its head whereby the latter may be broken off after the screw has been driven home.

10. A locking seal for preventing the separation of a plurality of parts comprising a frangible U-shaped member, and a securing screw passing through one leg of said member and provided with a weakened portion below its head, which latter may be broken off below the face of said member after securing the same in place.

11. A locking seal for preventing the separation of a plurality of parts comprising a frangible U-shaped member, and a securing screw threaded in one leg of said member and adapted to abut against the other leg, said screw having a weakened portion below its head which latter may be broken off below the face of said member after securing the same in place.

12. A locking seal for preventing the separation of a plurality of parts comprising a frangible U-shaped member each leg of which is provided at its free end with an inturned foot, and a securing screw passing through one leg of said member provided with a weakened portion below its head which latter may be broken off below the face of said member after securing the same in place.

In testimony whereof I have hereunto set my hand in presence of two subscribing witnesses.

PHILIP MUELLER.

Witnesses:
WILLIAM R. BIDDLE,
CATHERINE E. MCKEOWN.